Dec. 31, 1963
K. F. HULME ETAL
PROCESS FOR PURIFYING INTERMETALLIC BINARY
ANTIMONIDES CONTAINING ZINC
AND CADMIUM IMPURITIES
Filed April 18, 1962
3,116,113
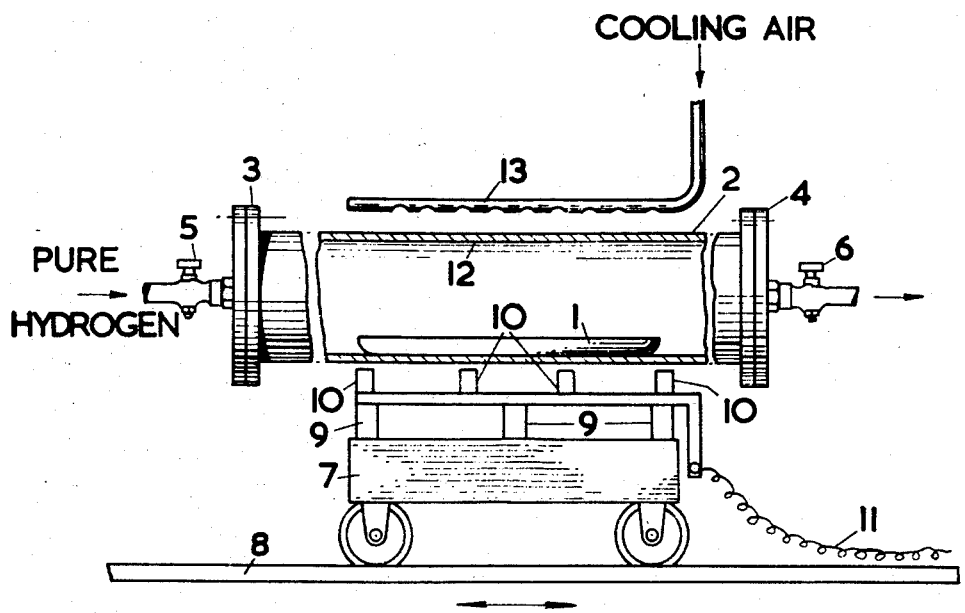
INVENTORS
KENNETH FRASER HULME
JOHN BRIAN MULLIN
By
Cushman, Darby & Cushman
Attorneys

United States Patent Office 3,116,113
Patented Dec. 31, 1963

3,116,113
PROCESS FOR PURIFYING INTERMETALLIC BINARY ANTIMONIDES CONTAINING ZINC AND CADMIUM IMPURITIES
Kenneth Fraser Hulme and John Brian Mullin, both of Malvern, England, assignors to National Research Development Corporation, London, England, a British corporation
Filed Apr. 18, 1962, Ser. No. 188,494
8 Claims. (Cl. 23—204)

This application is a continuation-in-part application Serial No. 781,653, filed December 19, 1958, now abandoned.

The invention relates to the preparation of purified single elements or compounds.

One process which is used for purification is that of zone refining. The basic principle is that if, in a mass of material containing impurities, a portion is molten and is in equilibrium with the remainder which is solid, the concentration of impurities measured in the solid portion is different from that in the molten. A convenient way of using this principle is to traverse a molten zone repeatedly and slowly in one direction along a bar of material; the result is that the impurities become segregated at the end of the traverse along the bar. An essential part of the process is, of course, that the material being purified is not subject to large losses by evaporation during zone refining.

Another process which is used is that of evaporation in which a mass of material is melted, often under vacuum, to evaporate unwanted volatile impurities; these are then condensed or otherwise prevented from returning to the mass.

Both these processes, because they involve melting, are generally limited to materials whose vapour pressures are not too high. Where the vapour pressure of the material to be purified, or of one of its essential constituents, is high and that of an impurity is also high there is difficulty in using an evaporation process, also a zone refining process; moreover if the impurity segregates only slowly during zone refining then there will be further difficulty in using such a process.

An example of a material where these difficulties arise is indium antimonide; two important impurities zinc and cadmium are volatile but so is antimony one constituent of the material; also zinc and cadmium segregate very slowly during zone refining. If it were not for these difficulties it would be desirable to make use of both processes in order to obtain indium antimonide of a desired purity, say, less than $2 \times 10^{14}$ carriers per cc.

An object of the invention therefore is to remove volatile impurities from a single element or compound material which is also volatile or possesses a volatile constituent.

According to the invention a purification process for purifying a single element or compound material comprises the steps of maintaining a molten mass of material in an evaporating chamber for a period to drive volatile impurities from the mass, the impurities driven off being collected on a cooled part of the chamber, introducing in to the chamber at the end of the period a gas inert relative to the material to inhibit further evaporation, and then zone refining the mass in the presence of the inert gas.

Conveniently indium antimonide may be purified by this process; this material may be made up by melting together appropriate proportions of its constituent elements and the ore refining step simply effects the melting together.

In order to make the invention clearer an embodiment will now be described in which the preparation of purified indium antimonide is carried out. Reference will be made to the accompanying drawings in which the figures shows diagrammatically an apparatus for purification of indium antimonide.

For the preparation of purified indium antimonide the apparatus of the drawings is used in which a crucible 1 contains pieces of indium and antimony in proportions arranged so that there is an excess of antimony over that required to form the stoichiometric compound indium antimonide (e.g. 285 gm. In, 353 gm. Sb). The crucible 1 is contained in a quartz tube 2 having end seals 3 and 4 which connect to control taps 5 and 6 respectively. A trolley 7 moving on rails 8 carries on suitable insulators 9 a number of flat strip heating elements 10 which are of arcuate shape to follow the curve of the tube 2. The heating elements 10 are connected by leads 11 to a convenient source of electric power.

Thus the crucible 1 is heated when current is passed to the heating elements 10; during this heating the valve 6 is connected to a vacuum pump and the valve 5 is closed. The indium and antimony in the crucible 1 are brought to melting point by the heating elements 10 so that volatile impurities are driven off together with some of the antimony. The top surface 12 of the tube 2 is maintained at a relatively low temperature by means of a multiple jet pipe 13 which directs compressed air against the outside of the top of the tube 2. The volatile impurities and the antimony which has been driven off are thus condensed on the surface 12 and continue to accumulate as the heating proceeds; the heating is continued for five hours.

At the end of the five hour period the vacuum pump is disconnected and the valve 5 is opened to admit pure hydrogen to the tube 2. Thus an atmosphere of hydrogen (380 millimeters pressure) is maintained over the contents of the crucible 1; hydrogen exhausts through the valve 6. Zone refining is now carried out by moving the trolley 7 repeatedly, first to one end of the tube 2 and then to the other, along the rails 8.

In the process as described above the action involves driving off volatile impurities, which in the case of indium antimonide are generally zinc and cadmium, and condensing them on the cool top surface 12, of the tube 2. During this stage some antimony is also driven off but this has been allowed for by the provision of the excess antimony. Accordingly at the end of the five hour period a large proportion of the volatile impurities has been driven off together with some antimony to leave indium antimonide containing only a small excess of antimony or indium.

The subsequent zone refining further purifies the indium antimonide in the crucible 1 and it is noted that very small amounts of volatile impurity are now involved; non-volatile impurities are segregated and owing to the atmosphere of hydrogen in the tube 2 very little antimony is driven off during this step. Thus the stoichiometry of the material in the crucible is established and preserved during zone refining.

The hydrogen used was dry, electrolytically pure hydrogen which had been passed through a deoxidising unit. It is anticipated that any suitable gas of adequate purity could be used, for example argon or helium, provided that it is inert with respect to the melt.

Although the evaporating of volatile impurities is described as being performed under vacuum and this is, indeed, the more usual way, it is conceivable that this step may be performed under a law pressure at which more favourable conditions of evaporation of volatile impurities relative to the evaporation of the material can possibly be obtained.

The volatility of impurities depends on many factors and conditions which should, of course, be arranged so that the relative volatility of the impurities to that of the material is as high as possible.

It is always difficult to trace the source of any additional impurities which might enter into a process but as far as they can be traced in the process of the present invention it appears that, provided the apparatus is thoroughly cleaned at the beginning of the process, the only likely source would be the gas stream; and this is largely eliminated by the use of purified gas.

One important advantage of the process is that it is carried out without the need to expose the material to an outside atmosphere or to transfer it to another apparatus—both possible sources of contamination—moreover the operations necessary, control of atmosphere and of heating conditions are both performed from outside the evaporation chamber.

In addition, of course, there is the practical advantage that limiting the manipulation of the material can give.

In some typical examples indium of 99.999% purity was introduced into the evaporation chamber together with antimony originally of 99.99% purity which had been further purified by zone refining (this also serves the important purpose of reducing scum formation when the material becomes molten).

Ingots of indium antimonide containing 250–450 gm. of material having less than $2 \times 10^{14}$ electron carriers at 90° K. (N-type) were obtained; some of this material had less than $1 \times 10^{14}$ electron carriers at 90° K. (N-type). No P-type material was obtained indicating the efficient removal of acceptors by evaporation. Good reproducability was also obtained.

It is expected that the process can be most advantageously applied to the preparation of purified single metals or intermetallic compounds where the vapour pressure of the metal or a constituent of the compound does not exceed say $10^{-2}$ mm. Hg at melting point.

In general, where this vapour pressure becomes too high, it is difficult to control the evaporation of the impurities and at the same time to retain sufficient of the volatile material or constituent; moreover it could prove difficult to prevent evaporation of the volatile material or constituent during zone refining, even in the presence of inert gas.

What we claim is:

1. A purification process for purifying intermetallic binary antimonides containing zinc and cadmium impurities comprising the steps of maintaining a molten mass of said antimonide in an evaporation chamber for a period to drive volatile impurities from the mass, cooling a part of the chamber whereby the impurities driven off are collected on the cooled part of the chamber, introducing into the chamber at the end of the period a dry gas inert relative to the antimonide to inhibit further evaporation, and then zone refining the antimonide in the presence of the inert gas.

2. A purification process as set forth in claim 1 in which said antimonide is indium antimonide.

3. A purification process as set forth in claim 1 including the step of evacuating the evaporation chamber for the period in which the volatile impurities are driven off.

4. A purification process as claimed in claim 3 comprising a preliminary step of providing the material to be purified by establishing a mixture of antimony and the metal which goes to make up the intermetallic binary antimonide in the chamber, the proportion of each being chosen to give an excess of antimony over that required for a stoichiometric intermetallic compound, and adjusting the duration of said period so that at its conclusion substantially stoichiometric intermetallic antimonide material remains.

5. A purification process as set forth in claim 4 in which said metal is indium.

6. A purification process as set forth in claim 4 in which the inert gas is hydrogen.

7. A purification process as claimed in claim 6 wherein the hydrogen is maintained at a pressure of one-half atmosphere.

8. A purification process as set forth in claim 1 in which the cool part of the chamber is established opposite the material by cooling the corresponding part of the outside of the chamber.

No references cited.